United States Patent
Dinkel et al.

(10) Patent No.: US 8,075,285 B2
(45) Date of Patent: Dec. 13, 2011

(54) ELECTROHYDRAULIC AGGREGATE WITH A COMPACT CONSTRUCTION

(75) Inventors: Dieter Dinkel, Schwalbach (DE); Hans-Jörg Feigel, Rosbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 606 days.

(21) Appl. No.: 11/913,882

(22) PCT Filed: May 12, 2006

(86) PCT No.: PCT/EP2006/062276
§ 371 (c)(1),
(2), (4) Date: Nov. 8, 2007

(87) PCT Pub. No.: WO2006/120245
PCT Pub. Date: Nov. 16, 2006

(65) Prior Publication Data
US 2008/0174192 A1    Jul. 24, 2008

(30) Foreign Application Priority Data

May 13, 2005  (DE) .......... 10 2005 023 039
Jul. 30, 2005  (DE) .......... 10 2005 035 834

(51) Int. Cl.
  *F04B 17/03*  (2006.01)
  *H02K 5/04*  (2006.01)
  *H02K 13/04*  (2006.01)

(52) U.S. Cl. ....... 417/410.1; 417/415; 310/90; 310/237; 310/239

(58) Field of Classification Search ............... 417/410.1, 417/415, 471; 310/88, 89, 90, 239, 237
See application file for complete search history.

(56) References Cited

U.S. PATENT DOCUMENTS 1,315,796 A * 9/1919 Scott .............................. 310/239
(Continued)

FOREIGN PATENT DOCUMENTS

DE    197 28 801 A1    1/1999
(Continued)

OTHER PUBLICATIONS

Patent Abstract of Japan, publication No. 10248225 A, date of publication Sep. 14, 1998, Applicant: Jidosha Denki Kogyo Co. Ltd.

*Primary Examiner* — Devon C Kramer
*Assistant Examiner* — Nathan Zollinger
(74) *Attorney, Agent, or Firm* — RatnerPrestia

(57) ABSTRACT

An electrohydraulic aggregate for converting electric energy into mechanical energy, comprising an electric motor with a stator and with a rotor, comprising magnets or electric windings that produce electromagnetic fields, at least one connecting component for connecting the windings to at least one energy supply, with the connecting component extending through at least one through-hole, the through-hole is provided in an accommodating member accommodating electrohydraulic valves as well as at least one piston pump for the energy supply of a slip-controlled brake system, the piston pump being connected to the electric motor by a gear, and a rotor mounting support comprising at least two spaced rotor bearings, of which at least one so-called A-bearing supports a shaft in the accommodating member, and a so-called B-bearing that is supported in a pot-shaped motor housing.

20 Claims, 9 Drawing Sheets

U.S. PATENT DOCUMENTS

| | | | | |
|---|---|---|---|---|
| 1,416,256 | A | * | 5/1922 | Borger ............................ 310/201 |
| 1,925,891 | A | * | 9/1933 | Apple et al. ................... 310/265 |
| 3,244,917 | A | * | 4/1966 | Gute ........................ 310/154.08 |
| 5,895,207 | A | * | 4/1999 | Burgdorf et al. ............ 417/410.1 |
| 6,163,093 | A | * | 12/2000 | Shimizu et al. ................ 310/420 |
| 6,196,812 | B1 | * | 3/2001 | Siegel ............................ 417/360 |
| 6,224,169 | B1 | * | 5/2001 | Aoki et al. .................. 303/116.4 |
| 6,420,811 | B1 | * | 7/2002 | Wetzel ........................... 310/112 |
| 6,617,745 | B1 | * | 9/2003 | Reinartz et al. ............... 310/247 |
| 6,803,695 | B2 | * | 10/2004 | Yamamoto et al. ......... 310/261.1 |
| 7,168,929 | B2 | * | 1/2007 | Siegel et al. ................... 417/415 |
| 7,187,097 | B2 | * | 3/2007 | Tanaka ............................ 310/90 |
| 7,309,940 | B2 | * | 12/2007 | Nommensen et al. . 310/216.044 |

FOREIGN PATENT DOCUMENTS

| | | |
|---|---|---|
| DE | 198 13 301 A1 | 9/1999 |
| DE | 199 58 927 C1 | 1/2001 |
| DE | 100 45 549 A1 | 3/2001 |
| EP | 1 038 745 A2 | 9/2000 |
| WO | WO 94/27045 | 11/1994 |
| WO | WO 98/36485 | 8/1998 |
| WO | WO 98/40954 | 9/1998 |
| WO | WO 2005/031949 A1 | 4/2005 |

* cited by examiner

ELECTROHYDRAULIC AGGREGATE WITH A COMPACT CONSTRUCTION

This application is the U.S. national phase application of PCT International Application No. PCT/EP2006/062276, filed May 12, 2006, which claims priority to German Patent Application No. DE102005023039.3, filed May 13, 2005 and German Patent Application No. DE102005035834.9, filed Jul. 30, 2005, the contents of such applications being incorporated by reference herein.

BACKGROUND OF THE INVENTION

1. Field of the Invention

The present invention relates to an electrohydraulic aggregate in a compact type of construction comprising a housing, a rotor, and a stator with electric windings, wherein a commutator-carbon brush system is provided in order to feed the electric windings with current depending on the rotary position of the rotor, and wherein the stator embraces the rotor, that comprises a shaft and permanent magnets, for mounting on an accommodating member.

2. Description of the Related Art

DE 100 45 549 A1 discloses an electric motor. For the reduction of the overall length of the electric motor, proposals are made that the rotor includes a recess on the side remote from the power take-off, which recess receives a commutator with a radially inwards directed cylindrical contact surface, and wherein radially outwards directed carbon brushes are provided formed fast with the housing, whose axle is arranged at right angles in relation to a continuous shaft. It is rendered possible this way to integrate the carbon brushes on the side remote from the power take-off quasi axially in the recess of the rotor. This measure reduces the axial overall length of the motor. A disadvantageous effect of this measure resides in that the diameter of the direct-current motor grows because the diameter of the recess must be dimensioned in such a fashion that the carbon brushes in their full overall length are received so as to be integrated in the rotor. More specifically, the favorable reduction in the axial direction has the disadvantageous effect of an increased diameter. Therefore, the known measure basically has redistribution as a result. The structural volume remains essentially constant.

According to the introductory part of the description of DE 100 45 549 A1 (column 1, lines 54 to 61), brush motors with carbon brushes arranged in parallel to a shaft (e.g. corresponding to Japanese patent application HEI 10(1998)-248225) are said to allow only a limited reduction in size of an aggregate. Electric motors with carbon brushes arranged radially to the direction of shaft are preferred for this reason.

Furthermore, DE 100 45 549 A1 discloses an electric motor, which includes radially directed brushes in a recess of the rotor in order to shorten the motor's overall length. This electric motor suffers from the fact that the mounting space gained in an axial direction is rendered possible by an extension in the radial direction.

WO 98/40954 discloses an electrohydraulic aggregate for an anti-lock brake device, which includes means for the axially movable mounting support and contacting of carbon brushes for an axial installation of the aggregate. The carbon brushes act upon an axial commutator. The motor has a continuous shaft with a freely overhanging shaft end, which comprises an eccentric with an eccentric bearing. Serving for the mounting support of the shaft is a so-called A-bearing, which is accommodated in the accommodating member, and a so-called B-bearing, which is carried by a pot-shaped motor housing.

SUMMARY OF THE INVENTION

An object of the invention involves providing an electrohydraulic aggregate of a compact construction with an electric motor, and the reduction in the overall length of thereof is not linked to the shortcoming of an increased diameter of the motor. An additional objective is to reduce the smoothness of running of the aggregate under load, as well as the structural volume of the aggregate, with a construction that complies especially with stress and lends itself to ease of mounting.

These objects are achieved in that the rotor, bypassing the shaft, is supported on the motor housing by means of an unrotatable axle. According to an aspect of the invention, it is possible to shorten the shaft and, consequently, the motor's overall length by supporting the rotor on the motor housing by way of a separate unrotatable axle, bypassing the shaft. The construction of the invention is advantageous in that shaft and axle have a shorter design, while the construction is in conformity with stress requirements in particular. As the flux of forces in the area of the B-bearing is discharged without the shaft, a shortened and, hence, deflection-resistant and low-vibration construction is achieved. The axle of the invention is rid of any torsional strain.

The smoothness in running and, more particularly, the wear in a pump eccentric is reduced by the provision of an eccentric bearing between A-bearing and B-bearing, or by arranging the eccentric bearing at a free end beside the B-bearing.

To be able to fight against wobbling or bending at the eccentric shaft end, arrangements are made that the eccentric bearing is provided between A-bearing and B-bearing, with the B-bearing supporting one end of the shaft, and that directly beside the eccentric bearing an additional thrust bearing is provided, which is supported in the accommodating member.

The specific selection of the bearings must take place depending on the technical marginal conditions. Eccentric bearings as well as A-bearing and B-bearing can be configured either homogeneously or alternately differently as roller bearings and/or as friction bearings. Roller bearings principally provide low losses due to friction, while friction bearings achieve high load capacities with a distinct robustness, yet place increased demands on the precision of the assembly.

The constructive measures with respect to the unrotatable axle cannot be easily seen in the outside view of the aggregate. This is because the axle is arranged at a bowl bottom of the motor housing and points in the direction of the bowl's interior. The overall length is reduced because the axle is provided in such a fashion that it is integrated in a recess of the rotor in an axial direction. It is simultaneously safeguarded that the axle accommodation with respect to the ambience does not project beyond a plane, which is defined by a largely plane contact surface of the motor housing. More specifically, the bowl bottom of the motor housing has a largely plane configuration and does not exhibit conspicuous curvatures to the outside.

In a favorable embodiment of the invention, the axle is designed as a separate component. The motor housing includes an accommodation for the axle for the purpose of attachment. The axle is press-fitted, glued or welded into the accommodation. This type of construction is advantageous because the axle can be made of high-strength material in an easy way, and e.g. roll bodies of the B-bearing run directly on the periphery of the axle.

The following configuration is favorable for the insertion of the axle into its accommodation. The accommodation comprises a cylindrical wall and a bottom, against which the axle moves to bear after the insertion process is completed. The bottom includes at least one through-hole for enclosed air to escape.

In another embodiment of the invention, the axle in its capacity as a hollow deep-drawn piece is designed integrally at the motor housing because a bottom of the motor housing is reshaped at least partly to a bowl, which extends concentrically to a wall of the motor housing. It is thus possible to produce the axle quasi as a side product when shaping the motor housing. It is principally feasible to punctually harden only the material of the axle, in order to apply the bearing forces onto it. Another solution founds on a largely cylindrical cover of hard material, which is lined up onto the axle before the rotor with the B-bearing is slipped into the stator.

The solution with a reduced overall length is improved further when the rotor includes a winding support with an accommodation for the B-bearing, with the B-bearing being provided in such a manner that it is substantially completely integrated in the winding support in an axial direction.

In order to reduce the mass of the direct-current motor with a given stability, it is proposed in a furthermore favorable fashion to make the winding support of a sintered material with low density. This measure will reduce inertia effects and unbalance effects for a long time. Further reduction in the mass of the direct-current motor can be achieved when the shaft and the winding support, being composed of the sintered material, have an integral design.

As is furthermore shown in a favorably compact design of the invention, the rotor has an axial commutator, and the axial commutator is contacted by carbon brushes being arranged in parallel to the axle in tubular cases in the at least one through-hole. The cases can be arranged fixedly at an electronic control unit of the aggregate, or they are provided at a mounting plate of the motor made of plastic material. As the effectiveness of anti-interference means reduces with increasing distance from the carbon brushes according to tendency, it is favorable that the cases comprise integrated anti-interference means such as anti-interference coils or capacitors in particular.

Manufacture of the direct-current motor is simplified when the axial commutator is joined from at least two components, with commutator hooks for windings and commutator segments for carbon brushes being provided on components, which can be separated from one another and can be joined electrically by being plugged into each other. This renders it possible to initially mount the windings onto the winding support with priority and to electrically connect their wire ends to commutator hooks. In a subsequent step, the component with the commutator segments for the carbon brushes is plugged onto the component with the commutator hooks, with the desired electrical connection between the two components being carried out simultaneously.

BRIEF DESCRIPTION OF THE DRAWINGS

Further details of the invention can be taken from the description making reference to the accompanying drawings. In the drawings, shown in a highly enlarged view in each case.

The object of the invention is to improve known electrohydraulic aggreagates and can be taken from FIGS. 1 to 8 in detail. Reference is made herein to the content of disclosure of WO 98/40954 corresponding to FIG. 9 as regards the principal design of a prior-art electrohydraulic aggregate.

DETAILED DESCRIPTION

Figure 1:
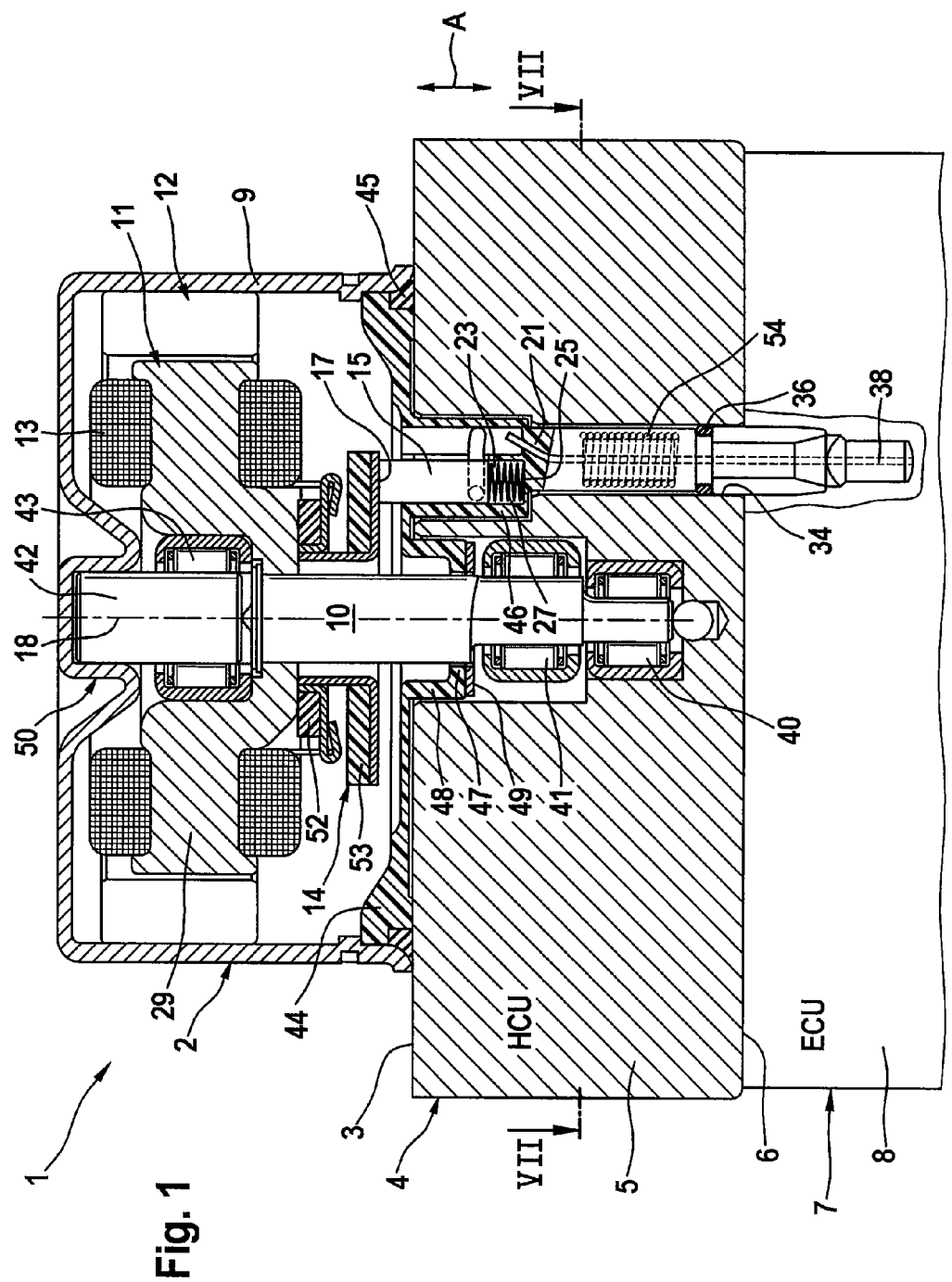
FIG. 1 is a cross-sectional view of a compact electrohydraulic aggregate according to a first embodiment.
Figure 9:
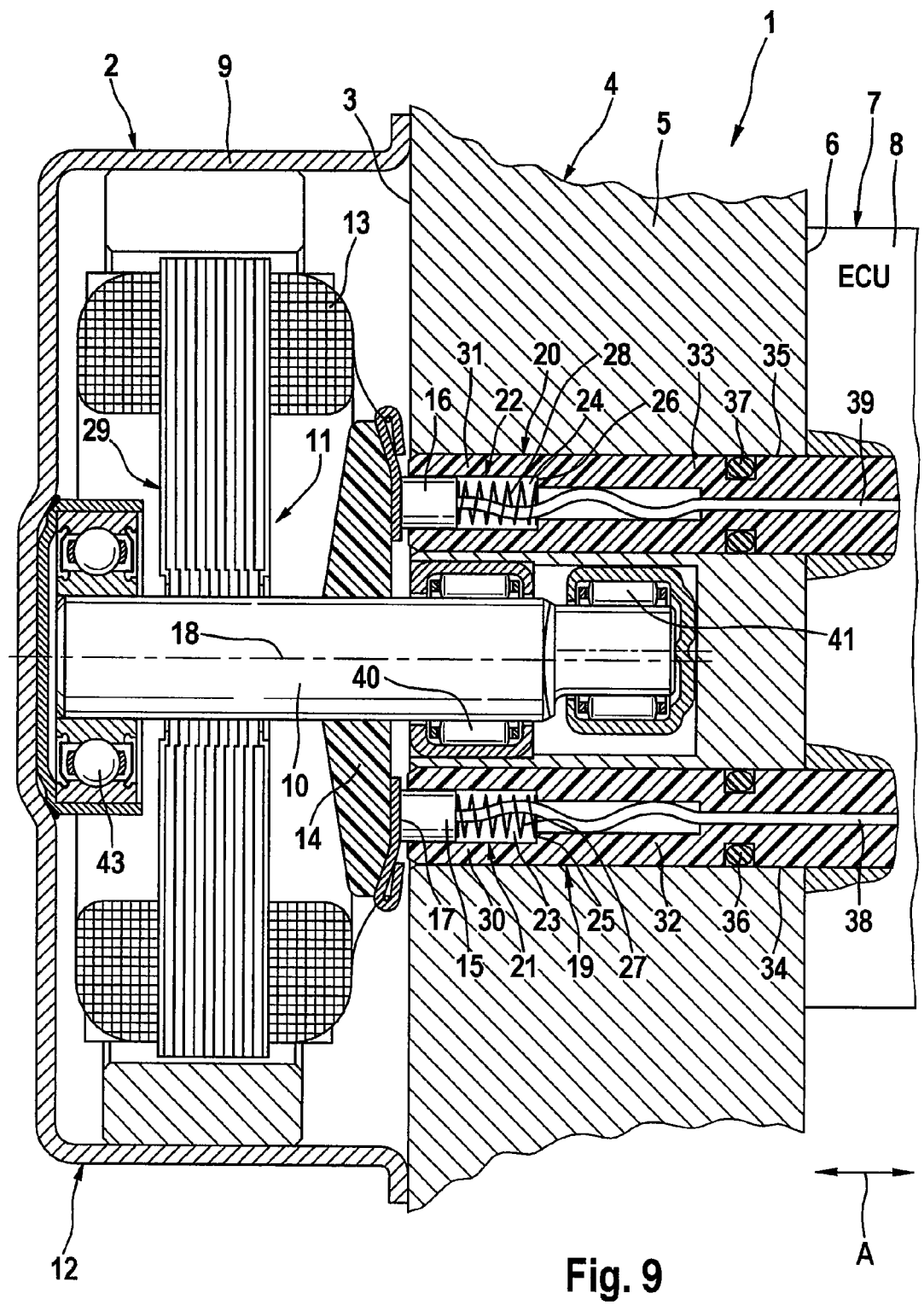
FIG. 9 is a view of a prior-art electrohydraulic aggregate according to WO 98/40954 for explanation purposes.

To begin with, reference is therefore made to FIG. 9 in order to explain principal relationships in electrohydraulic aggregates. The electrohydraulic aggregate 1 serves for the hydraulic energy supply of an anti-lock brake device of a motor vehicle. The aggregate comprises an electric motor 2, which is arranged and fastened at a first side 3 of an accommodating member 4 (HCU) with electrohydraulic valves and with a housing 5 for a piston pump. An electronic unit 7 (ECU) with a housing 8 is arranged and fastened on another side, i.e. the second side 6 of the accommodating member 4. Unit 7 basically serves to actuate solenoid valves (not shown) for the modulation of the brake pressure in brake units as well as for the electric supply of the electric motor 2. The electric motor 2 is equipped with a stator 12 with a pot-shaped motor housing 9 comprising magnets and a rotor 11 with a shaft 10. Spaced bearings are used for the mounting support of the rotor, and it has become general practice to designate a bearing closed to power take-off as A-bearing 40, while the bearing close to the motor housing is referred to as B-bearing 43. An eccentric that is fixed to a shaft is encompassed by an eccentric bearing 41. Rotor 11 further comprises a winding support 29 including windings 13. A commutator 14 is arranged on the shaft 10 in an unrotatable manner. The commutator 14 is disc-shaped, equipped with segments, and is spring-applied by carbon brushes 15, 16 in an axial direction A, that means in parallel to the shaft 10. The diameter of the commutator 14 is larger than its overall length. Its contact surface 17 is effective in an axial direction and extends at right angles relative to the axis of rotation 18 of the electric motor 2. Means 19, 20 are provided for the axially movable mounting support and contacting of the carbon brushes 15, 16 for the purpose of axial mounting of the aggregate 1. As FIG. 1 shows, the means 19, 20 are disposed diametrically opposite each other at the electronic unit 7 so that the latter forms an electric modular unit together with the carbon brushes 15, 16. The carbon brushes 15, 16 are positioned in the accommodating member 4 so that the electric motor 2 is decreased by the size of the carbon brushes 15, 16. Besides the carbon brushes 15, 16, contacting of additional electric components of the electric motor 2 is not absolutely necessary. As means 19, 20, the electronic unit 7 includes two carbon brush cases 21, 22 for the carbon brushes 15, 16, the cases acting in parallel to the axis of rotation 18. Each carbon brush case 21, 22 points axially to the contact surface 17 and essentially comprises a pocket 23, 24 being open towards the motor and a frontal stop surface 25, 26. Interposed between the stop surfaces 25, 26 and the carbon brushes 15, 16 is a spring 27, 28, biasing the carbon brushes 15, 16 in the direction of the contact surface 17.

The carbon brush cases 21, 22 are arranged at ends 30, 31 of projecting arms 32, 33 of the electronic unit 7, and the number of the arms 32, 33 corresponds to the number of the carbon brushes. The arms 32, 33 extend axially in parallel to the shaft 10 in the direction of the commutator 14. As is illustrated in FIG. 9, the arms 32, 33 extend through two through-holes 34, 35 of the accommodating member 4 being arranged in parallel to the shaft 10. The arms 32, 33 are provided with sealing elements 36, 37, which abut on the hole wall. The through-holes 34, 35 enclose an angle of 180°. It should be noted that conductor elements 38, 39, sheet-metal parts or similar elements can extend inside the arms 32, 33, which serve for the electrical contacting of the carbon brushes 15, 16 and lead to electric connecting elements in the area of the electronic unit 7.

Hereinbelow, reference is initially made to the common features of all embodiments of the invention according to FIGS. 1 to 8, while subsequently indicating the differing particulars.

With regard to FIGS. 1 to 8, the invention is based on special characteristics in the mounting support, the commutation and the arrangement of bores of the aggregate 1. All embodiments of the invention comprise a divided shaft, and the rotor 11, at an end close to the motor housing, is supported on the motor housing 9 by means of an unrotatable axle 42, bypassing the driving shaft 10. One special feature of this divided type of construction involves that the load collective of the axle 42 is reduced compared to the shaft 10. This is because the length of the axle 42 is rid of torsion reactions. In other words, the axle 42, compared to shaft 10, does not have to bear torsional stress. This advantage can be achieved by a corresponding design of the axle 42 and the B-bearing 43. Consequently, the invention brings about a less critical load collective with respect to the rotor mounting support in the area of the B-bearing 43.

Figure 2:
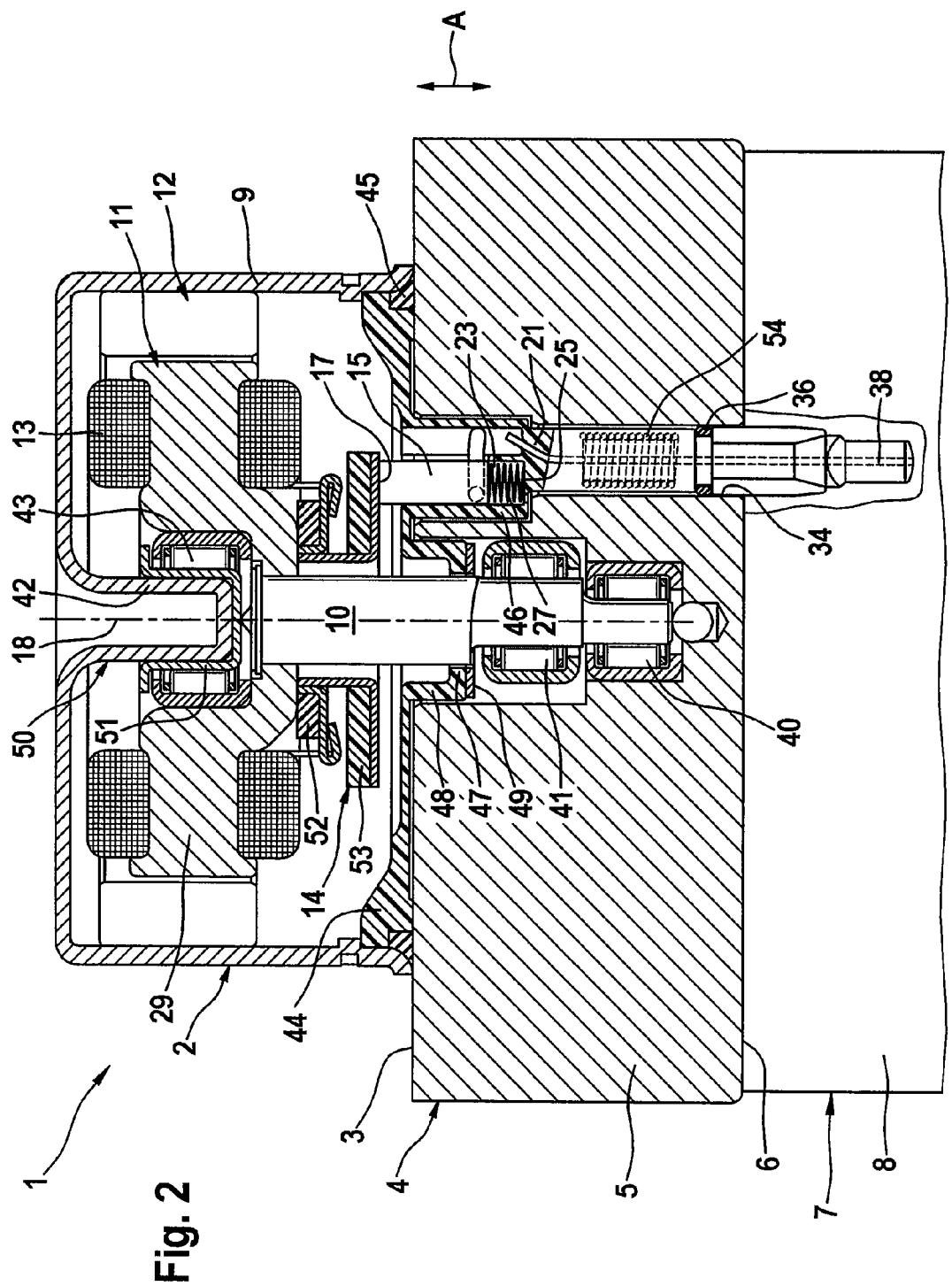
FIG. 2 is a cross-sectional view of a second embodiment.
Figure 3:
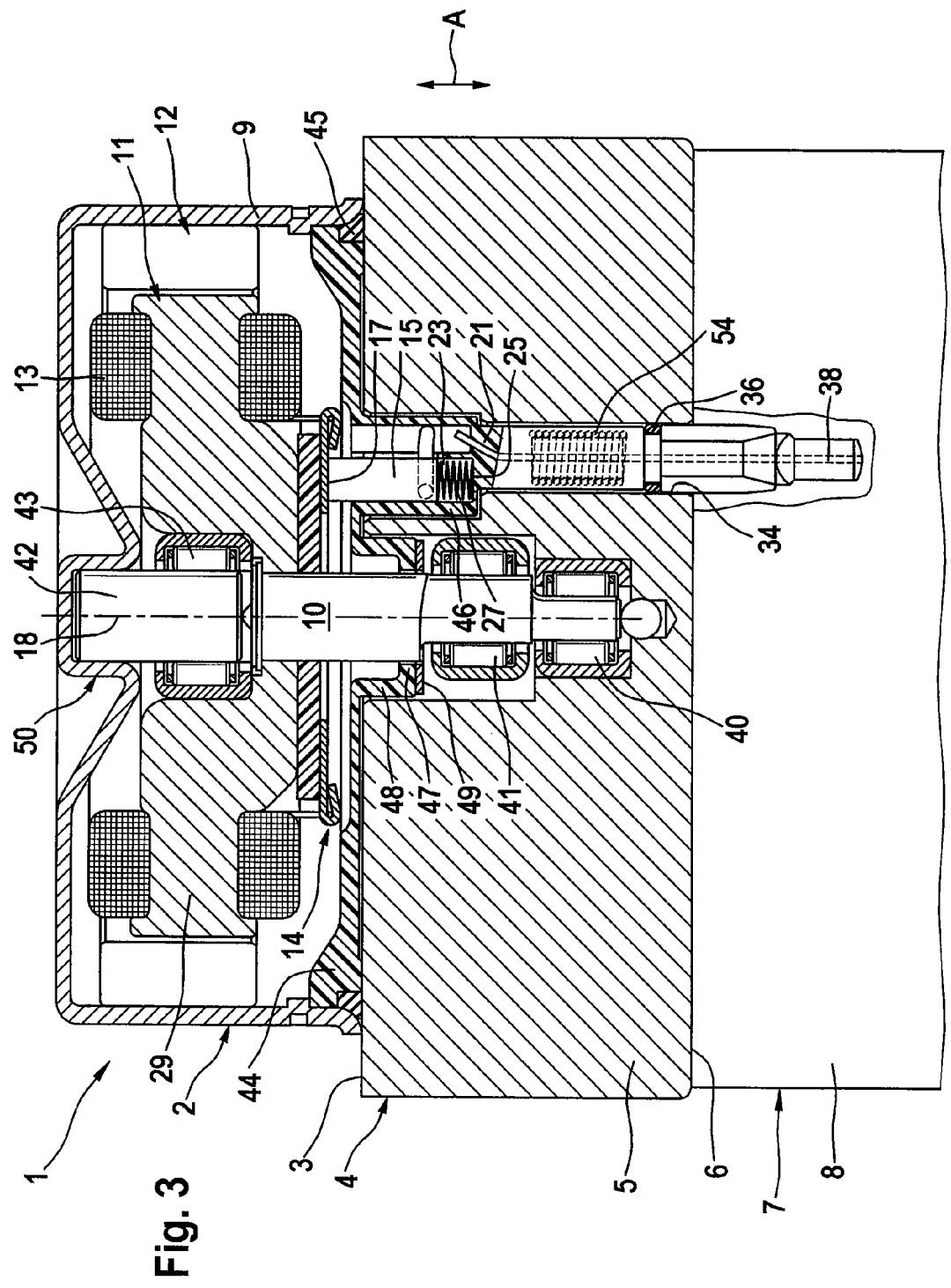
FIG. 3 is a cross-sectional view of a third embodiment.

The embodiments according to FIGS. 1, 2 and 3 have a configuration of the rotor mounting support of the type of a carrier on two frontal props, and the eccentric bearing 41 is arranged between A-bearing 40 and B-bearing 43. The embodiment according to FIG. 8 comprises an additional thrust bearing.

It is principally feasible according to FIGS. 1, 2, 3 and 8 that a pot-shaped motor housing 9 is closed by a cover 44 made of a plastic material, the basic objective of which is to carry the brushes 15, 16 and to prevent the ingress of pump leakage fluid into the motor's interior. Sealing is performed by a seal 45 that is preferably injection-molded at the cover 44, and by a three-sided abutment of the seal 45 between cover 44, side 3, and inside wall of the motor housing 9. As the commutator 14 is configured as an axial commutator, there is an especially positive self-cleaning property of the invention at issue because the commutator 14 expels contaminants, in particular leakage fluid, radially outwards in an effective manner.

To guide the carbon brushes 15, 16, the cover 44 according to FIGS. 1 to 3 comprises integrally shaped carbon brush cases 21, 22, which are arranged in parallel to shaft 10. For this purpose, each one cylindrical connecting piece 46 is provided, engaging into the accommodating member 4. According to FIG. 7, the carbon brush cases 21, and therefore also the corresponding through-holes 34, 35, enclose an angle α amounting to less than 180°. A particularly favorable drive variant is equipped with a four-pole motor with only two carbon brushes 15, 16, which enclose an angle α of 90°. As becomes apparent from FIG. 7, the configuration of an aggregate of this type is such that there is no accommodating bore for a pump within the described angle α. This renders it possible to position the two continuous accommodating bores 34, 35 for the carbon brush cases 21, 22 in the interior of the accommodating member 4 in spite of significant shortage of space.

To simplify the manufacture of the electric motor 2 as an independent subassembly at a supplier's end, the cover 44 can include an emergency bearing function for a test initiation. For this purpose, the cover 44 can be designed quasi as a closed fire wall exhibiting a narrow shaft passage with a provisional friction bearing 47. After the mounting of the aggregate 1, bearing forces are introduced, however, substantially completely from A-bearing and B-bearing 40, 43 into the housing. It is obvious that axial forces are introduced through an axial bearing into the accommodating member 4. The motor is centered in that the cover 44 is provided with a centric, pot-shaped centering projection 48, which additionally can carry the provisional friction bearing 47 and can be slipped into a stepped bore of the housing 5. A frontal end of the centering projection 48 has a reinforcement 49 to allow the eccentric bearing 41 to move into contact in an axial direction A.

To reduce the overall length, a winding support 29 of the rotor 11 overlaps the motor-end B-bearing 43 at least in part. It becomes thus possible to receive the radial forces close to the center of the mass forces of rotor 11.

It can be taken from FIGS. 1 to 4 and 6 to 8 that the motor housing 9 has a bowl 50. Principally, the bowl 50 can be bulged concavely in the direction of the motor's interior or convexly in the direction of the ambience. Bowl 50 is punched or deepdrawn integrally out of the material of the motor housing 9 and is used to accommodate the axle 42. The special feature of this weight-optimized embodiment resides in that the axle 42 is not made of solid material. According to FIG. 2, the axle 42 is made of the comparatively ductile material of the motor housing 9. To achieve a defined and hardest possible low-friction running surface for the B-bearing 43, the axle 42 carries an additional, at least partly hardened bowl 51.

According to FIG. 1, the motor housing 9 comprises a bowl 50, which is shaped convexly in an outward direction. The bowl's purpose is to receive a comparatively short, stub-shaped axle 42, which is separated from the torque-transmitting shaft 10. Shaft 10 is at a small axial distance from axle 42. The shaft is furnished with a rotation-translation transducer (gear, eccentric) in order to drive pump pistons (not shown), which lie diametrically opposite each other, with a certain axial offset.

A crank chamber bottom has a spherical bearing element for the reduction of axial friction forces. A front end of shaft 10 close to the B-bearing is provided with a projection shaped like a fillister head. For friction reduction, the projection can move axially into abutment on a frontal end of the axle 42 (FIGS. 1, 3, 8) directly or indirectly by way of a bottom of bowl 51 at axle 42 (FIGS. 2, 4, 6).

A special feature of the embodiments according to FIGS. 1, 2, 4 and 6 involves that the commutator 14 has a multi-part design. Essential components are interconnected by a mechanical plug connection with a simultaneous electrical contacting between windings and commutator segments. As can be seen, the commutator hooks are disposed axially behind the contact surface 17 for carbon brushes 15, 16. To this end, the commutator 14 comprises a largely disc-shaped component 52, which is connected to winding wires, as well as a bushing-shaped component 53 with an L-profile cross-section, the L-leg of which serves for the abutment of the brushes 15, 16. It is obvious that the component 53 is connected also electrically to the respective windings 13 by way of the plug coupling.

Figure 8:
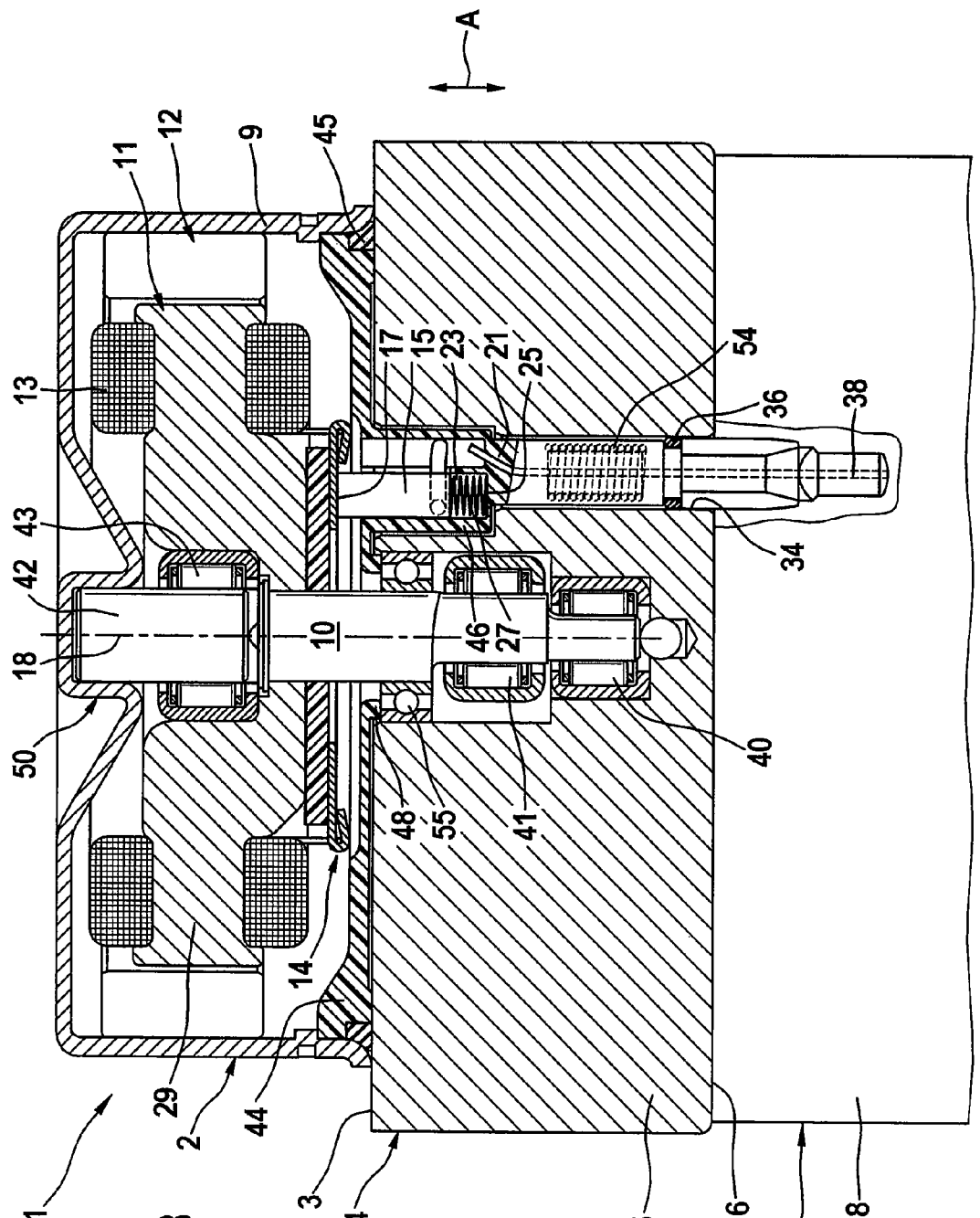
FIG. 8 is a cross-sectional view of a sixth embodiment.

In contrast thereto, FIGS. 3 and 8 depict a commutator 14, which is almost completely plane and has an integral design, and with the commutator hooks being arranged radially outside the contact surface 17 for carbon brushes 15, 16. This type of construction is advantageous in that the overall length is reduced still further, what causes a gradually increased diameter though.

Figure 4:
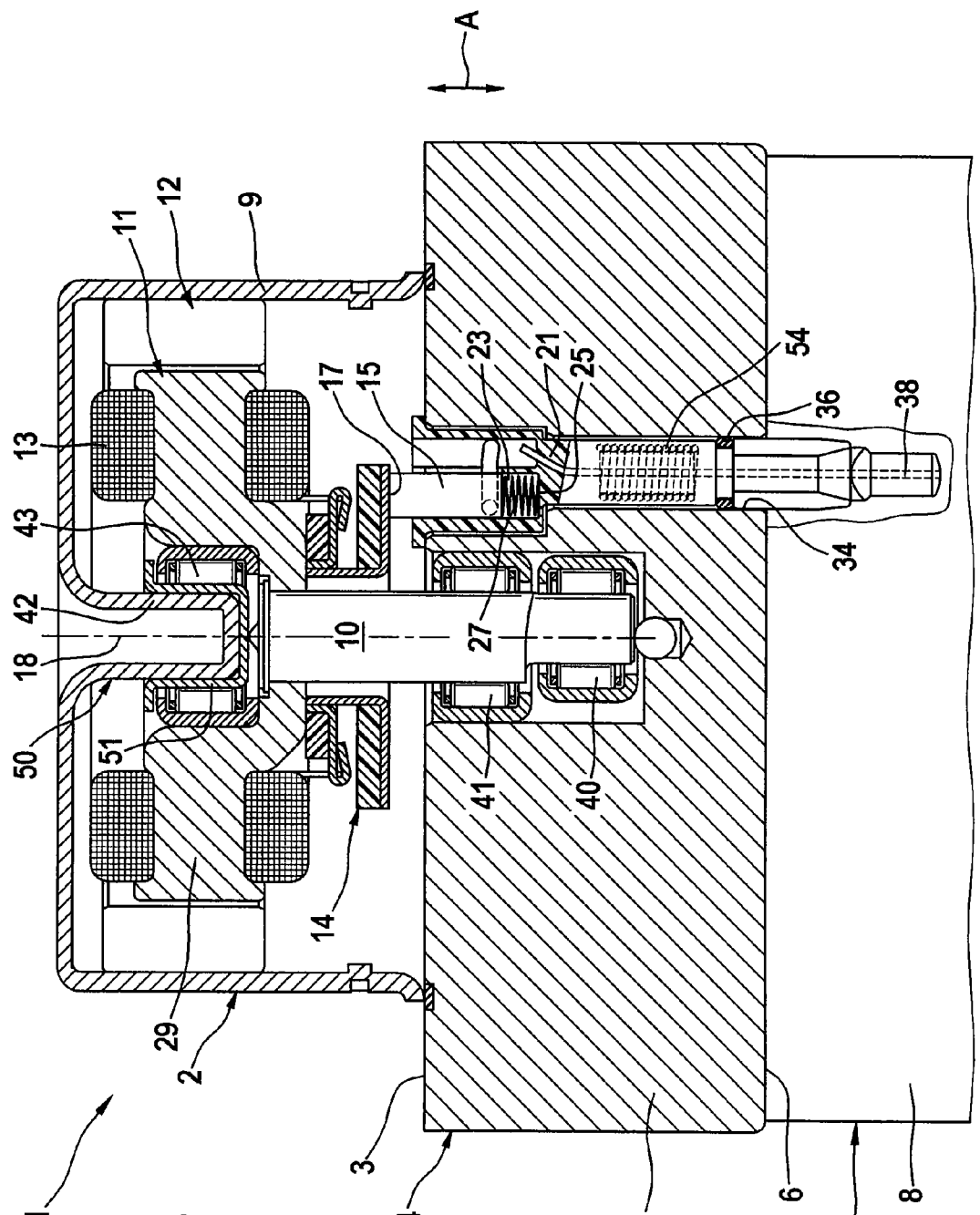
FIG. 4 is a cross-sectional view of a fourth embodiment.
Figure 5:
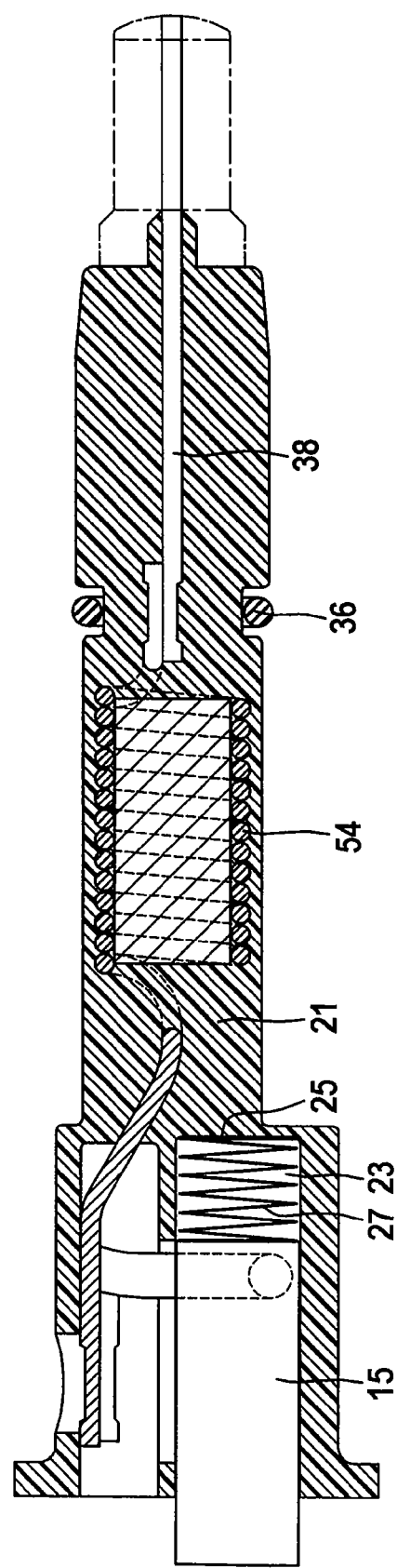
FIG. 5 is a cross-sectional view of details of a carbon brush case.
Figure 6:
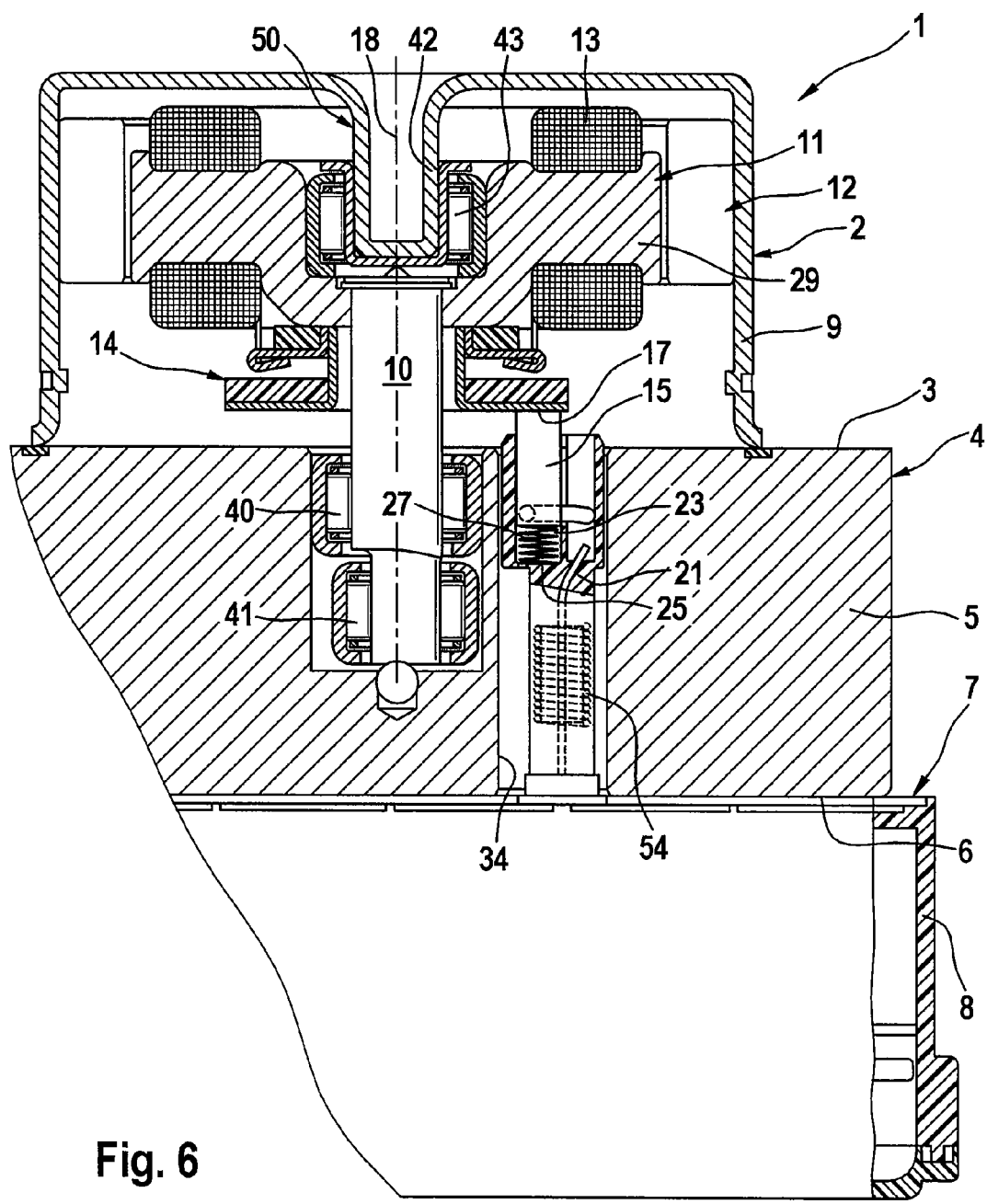
FIG. 6 is a cross-sectional view of a fifth embodiment.
Figure 7:
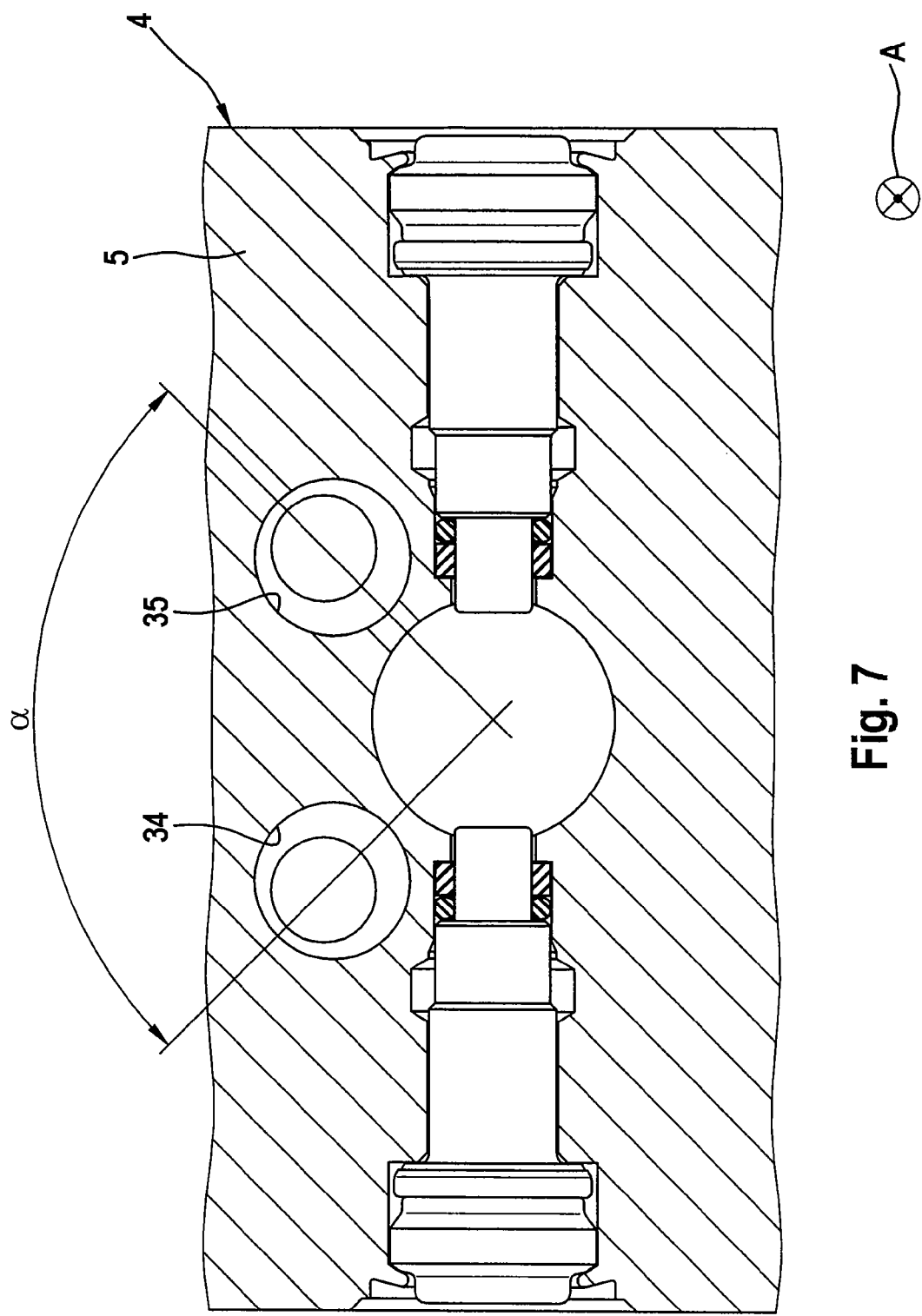
FIG. 7 is a cross-section taken along line VII-VII in FIG. 1.

The embodiments of FIGS. 4 and 6 differ from the embodiments of FIGS. 1, 2, 3 and 8 in that the cover 44 for closing the pot-shaped motor housing 9 is eliminated. A so-called parts motor is concerned, because the motor comprises only one B-bearing 43 close to the housing and is supplied as a non-operable subassembly for the assembly of the aggregate. In a variant according to FIGS. 4 and 5, separate carbon brush cases 21, 22 are necessary, which are no component of the motor modular unit. According to FIG. 4, the carbon brush cases 21, 22, starting from the side of the electric motor, are slipped axially, that means in parallel to the shaft 10, into stepped through-holes 34, 35 of the accommodating member 4.

A somewhat different variant of a parts motor according to FIG. 6 consists in that the carbon brush cases 21, 22 are arranged integrally or detachably plugged at the housing 8 of the electronic unit 7 in such a fashion that the carbon brush cases 21, 22 are inserted into the accommodating member 4 when the electronic unit 7 is mounted.

It is favorable for interference elimination when the carbon brush cases 21, 22 have integrated anti-interference means 54, as is illustrated exemplarily in FIG. 5. For this purpose, each carbon brush case 21, 22 predominantly is made of plastic material, and the anti-interference means are embedded into the plastics or there is an injection-mold around them. For example, an electric anti-interference coil is integrated in the current supply line, the axis of which coil extends in parallel to the motor shaft 10. Equally, an anti-interference capacitor can either be integrated or arranged on a circuit board of the electronic unit 7.

The electric motor 2 is fastened to the accommodating member 4 by appropriate means in positive or operative and sealed engagement therewith. As can be seen in FIGS. 4 and 6, the housing 4 has a groove with an integrated flat packing ring, with the motor housing being seated on the flat packing ring.

The embodiment of FIG. 8 offers an especially low-noise and precise shaft mounting support because an A-bearing 40, 55 is accommodated in the accommodating member 4 in each case directly on both sides of an eccentric bearing 41, and with the shaft end close to the motor housing with the B-bearing 43 being supported in the motor housing 9. Although a variant of this type is seemingly over determined in terms of statics, a vibration-reducing and noise-reducing effect prevails.

Hereinbelow follows a short and precise summary of special features of embodiments of the invention:

A direct-current motor for driving pumps for electronic brake systems with the following features is proposed:
- rotor/winding support with deep bearing recess for the axially and radially integrated accommodation of the B-bearing;
- preferably one-part sintered rotor with an inward B-bearing; direct accommodation of the B-bearing forces close to, preferably in, the rotor's center of gravity;
- sintered construction for low inertia forces and mass forces;
- shaft with gear eccentric can be press-fitted into sintered winding support;
- shaft with gear eccentric and winding support is possible in integral type of construction;
- B-bearing axle separated from the shaft can be fixedly arranged in the motor housing (see FIG. 1; welding, in particular stored energy welding is possible);
- B-bearing can be designed as a friction bearing (in particular as a Teflon bush)—improved miniaturized construction is thereby achieved;
- axial shaft mounting support is possible by ball in the valve block and fillister head at the shaft or at the separated B-bearing axle;
- A-bearing can be arranged between freely overhanging gear eccentric and B-bearing—as a result, easy-to-mount and a small number of bearings (FIG. 4)
- B-bearing can be shaped integrally at the motor housing (bowl)—hence, economy of a separate component and its assembly (FIG. 4);
- winding is positioned behind the axial projection of an axial commutator, the said can be designed as a two-part collector with pluggable contacting between commutation surface and winding hooks (FIGS. 1, 2, 4, 6);
- carbon brush cases are arranged inside the accommodating member;
- carbon brush cases as plugs (a male or female plug part on the ECU side);
- carbon brush cases with integrated electric plug for the electrical connection to the electronic control unit (multiple functionality);
- modular unit of motor-cover and axially directed carbon brush cases (FIGS. 1, 2, 3);
- carbon brush case as a separate plug element comprising carbon brushes, anti-interference means such as in particular coil, capacitor, electric plug connector to the ECU, integrated hydraulic sealant (FIG. 4);
- parts motor is possible by deletion of cover (FIGS. 4, 6).

The invention claimed is:

1. Electrohydraulic aggregate for converting electric energy into mechanical energy, comprising an electric motor with a stator and with a rotor, comprising magnets, and electric windings that produce electromagnetic fields, the windings supported on a winding support of the rotor, at least one connecting component for connecting the windings to at least one energy supply, with the connecting component extending into at least one through-hole, the through-hole being provided in an accommodating member accommodating electrohydraulic valves as well as at least one piston pump for the energy supply of a slip-controlled brake system, the piston pump being connected to the electric motor by a gear, and a rotor mounting support comprising at least two spaced bearings, of which at least one A-bearing supports the rotor through a shaft in the accommodating member, and a B-bearing bypassing the shaft, directly supports the rotor, wherein the B-bearing is positioned between the winding support and an unrotatable axle, wherein the unrotatable axle is a separate component, a housing of the motor includes an accommodation for the unrotatable axle, and the unrotatable axle is positioned in the accommodation, with the accommodation being provided as a bowl.

2. Electrohydraulic aggregate as claimed in claim 1, wherein an eccentric bearing is provided between the A-bearing and B-bearing, or the eccentric bearing is provided at a free end of the shaft beside the B-bearing.

3. Electrohydraulic aggregate as claimed in claim 1, wherein an eccentric bearing is arranged between the A-bearing and an additional thrust bearing, with the A-bearing and the thrust bearing being supported in the accommodating member.

4. Electrohydraulic aggregate as claimed in claim 1, wherein the A-bearing and B-bearing are configured either uniformly or alternately differently as roller bearings, friction bearings or a combination thereof.

5. Electrohydraulic aggregate as claimed in claim 1, wherein the axle is arranged at a bowl bottom and points in the direction of the bowl's interior.

6. Electrohydraulic aggregate as claimed in claim 1, wherein the axle in an axial direction (A) engages into a recess of the winding support.

7. Electrohydraulic aggregate as claimed in claim 1, wherein the axle is inserted, press-fitted or welded into the accommodation of the motor housing.

8. Electrohydraulic aggregate as claimed in claim 1, wherein the bowl is deepdrawn convexly in an outward direction and does not project from a plane that is defined by a largely plane bottom of the motor housing.

9. Electrohydraulic aggregate as claimed in claim 1, wherein the bowl includes a cylindrical wall and a bottom.

10. Electrohydraulic aggregate as claimed in claim 1, wherein the winding support accommodates the B-bearing, with the B-bearing in an axial direction (A) being provided so as to be substantially integrated in the winding support.

11. Electrohydraulic aggregate as claimed in claim 10, wherein the winding support is made of sintered material.

12. Electrohydraulic aggregate for converting electric energy into mechanical energy, comprising an electric motor with a stator and with a rotor, comprising magnets, and electric windings that produce electromagnetic fields, the windings supported on a winding support of the rotor, at least one connecting component for connecting the windings to at least one energy supply, with the connecting component extending into at least one through-hole, the through-hole being provided in an accommodating member accommodating electrohydraulic valves as well as at least one piston pump for the energy supply of a slip-controlled brake system, the piston pump being connected to the electric motor by a gear, and a rotor mounting support comprising at least two spaced bearings, of which at least one A-bearing supports the rotor through a shaft in the accommodating member, and a B-bearing bypassing the shaft, directly supports the rotor, wherein the B-bearing is positioned between the winding support and an unrotatable axle, wherein the shaft and the winding support, being composed of a sintered material, have an integral design, wherein the unrotatable axle is a separate component, a housing of the motor includes an accommodation for the unrotatable axle, and the unrotatable axle is positioned in the accommodation, with the accommodation being provided as a bowl.

13. Electrohydraulic aggregate as claimed in claim 1, wherein the rotor has an axially directed commutator, which is contacted by carbon brushes being arranged in parallel to an axis of rotation in the at least one through-hole.

14. Electrohydraulic aggregate as claimed in claim 13, wherein the accommodating member includes two additional through-holes for carbon brush cases, which enclose an angle of 180° or less.

15. Electrohydraulic aggregate as claimed in claim 14, wherein the carbon brush cases are provided with integrated anti-interference means.

16. Electrohydraulic aggregate as claimed in claim 13, wherein the commutator has a multi-piece design and is joined from at least two components, and commutator hooks for windings and commutator segments for carbon brushes are provided on components, which can be separated from one another and can be joined by being plugged into each other.

17. Electrohydraulic aggregate as claimed in claim 1, wherein the winding support extends radially from the shaft, and the B-bearing is at least partially positioned in a recess formed in the winding support.

18. Electrohydraulic aggregate as claimed in claim 17, wherein at least one of the magnets or electric windings are supported on a terminal end of the winding support in which the recess is formed.

19. Electrohydraulic aggregate as claimed in claim 17, wherein the winding support at least partially overlaps the B-bearing.

20. Electrohydraulic aggregate as claimed in claim 1, wherein the accommodating member includes two additional through-holes for carbon brush cases and the additional through-holes for carbon brush cases are separated by an angle of 90° with respect to the shaft in the accommodating member.

* * * * *